March 8, 1960
T. E. LOHR
2,927,627
VEHICLE SEAT ADJUSTER
Filed May 12, 1958
3 Sheets-Sheet 1
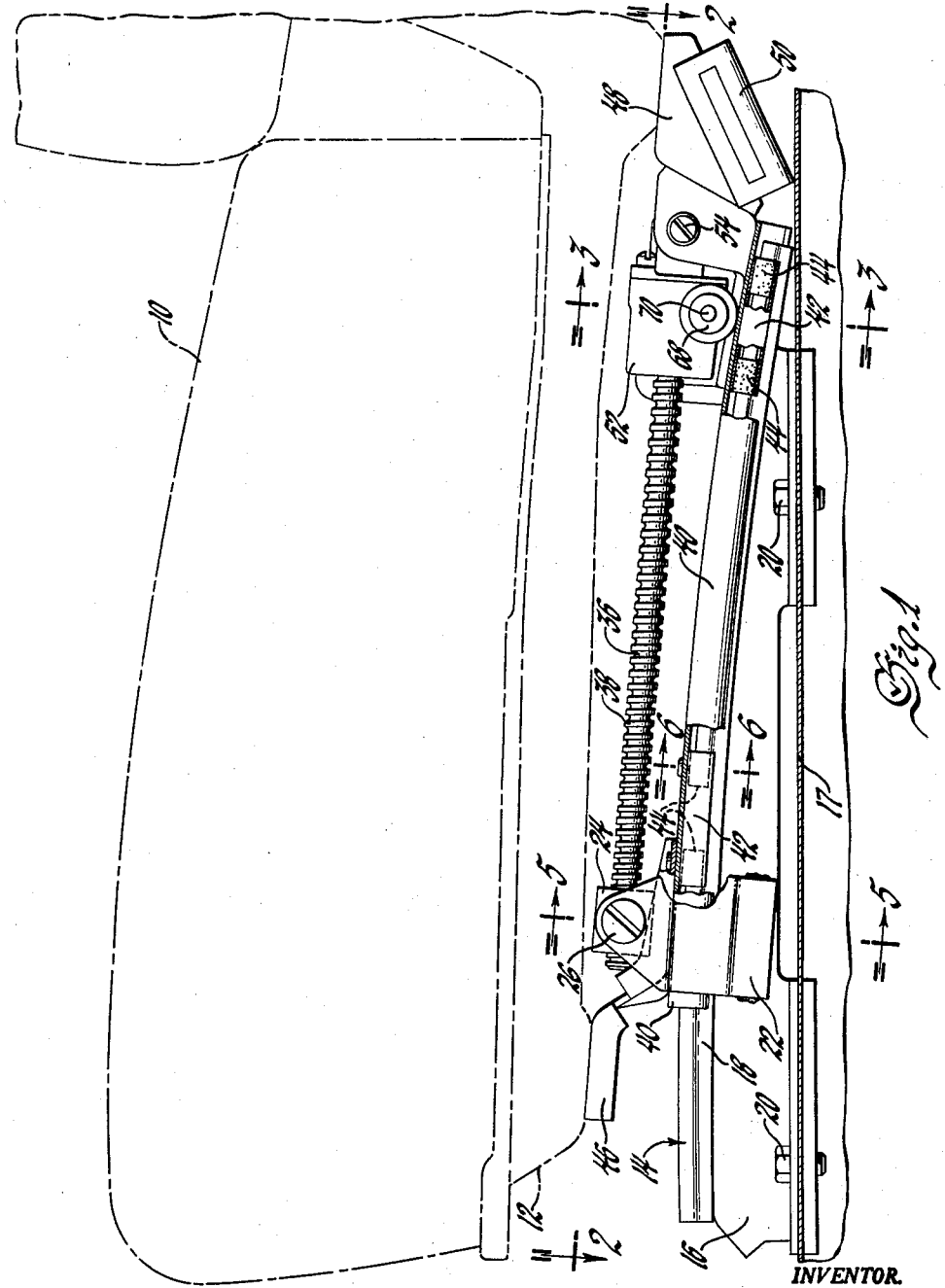
INVENTOR.
Thomas E. Lohr
BY
E.W. Christen
ATTORNEY

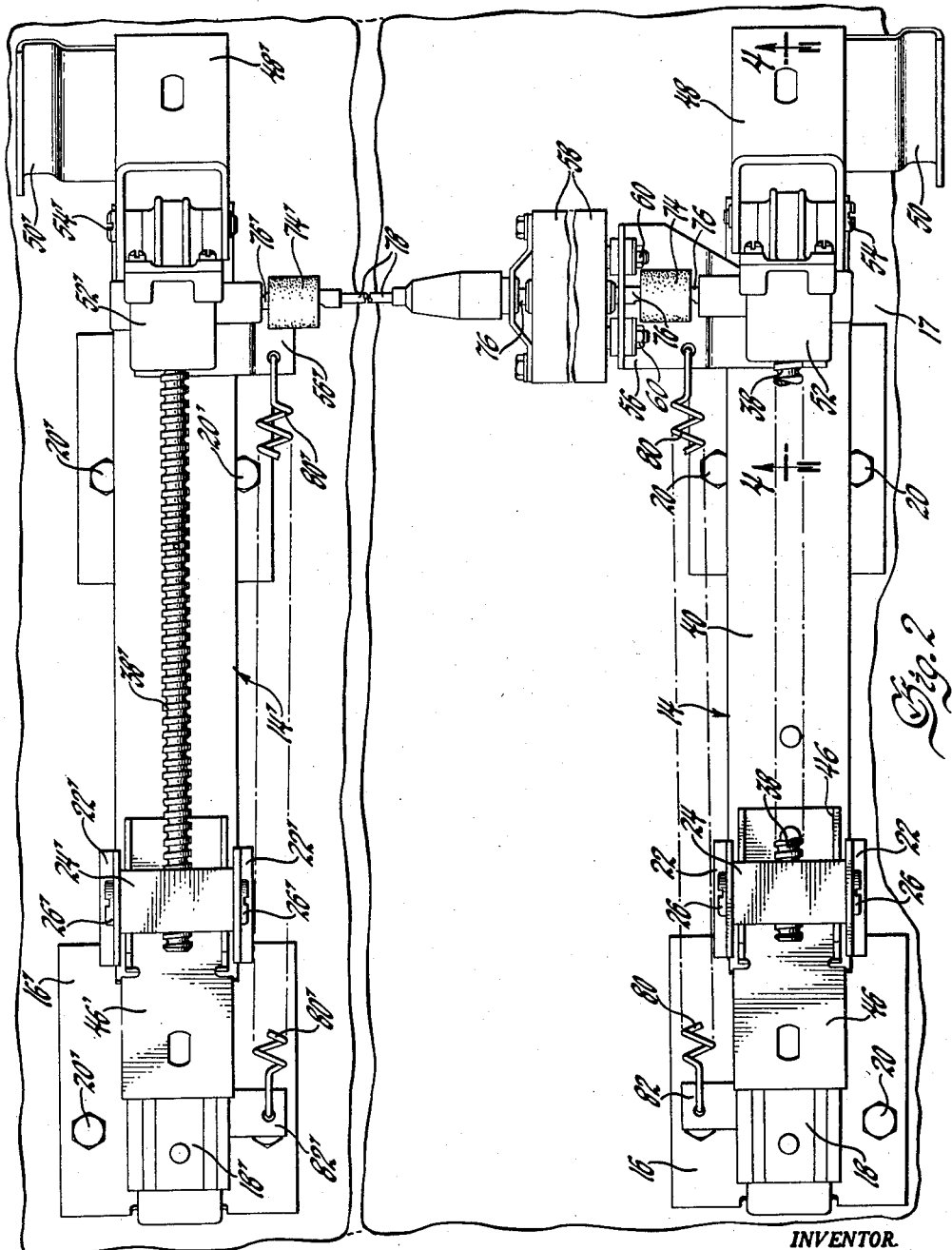

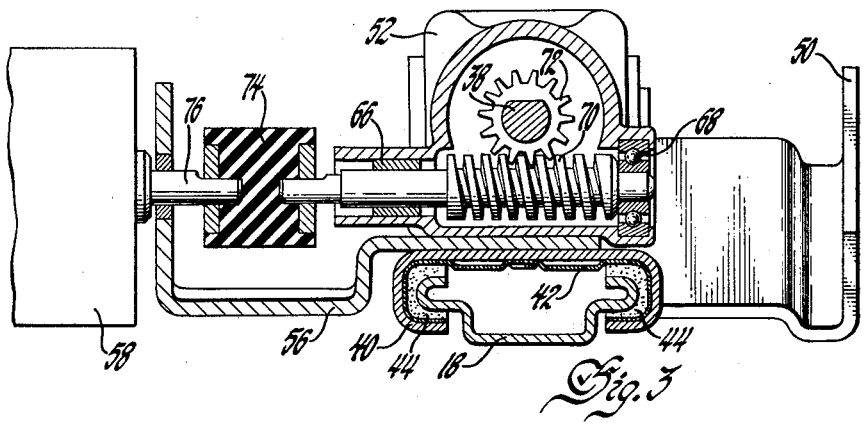
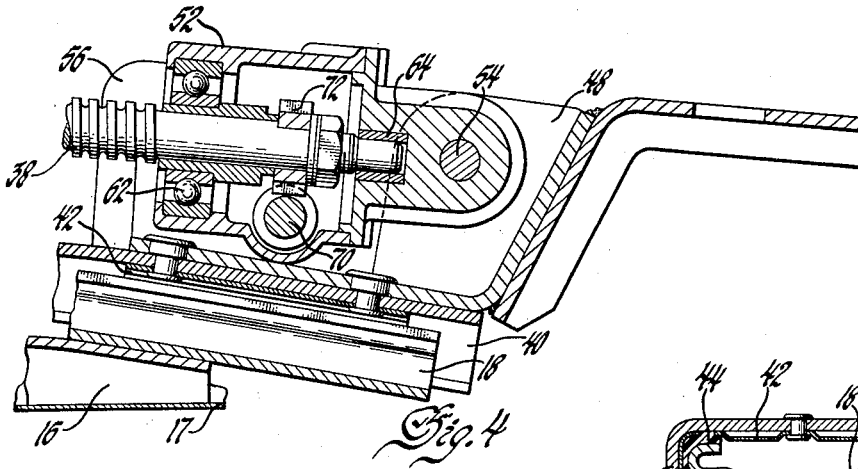
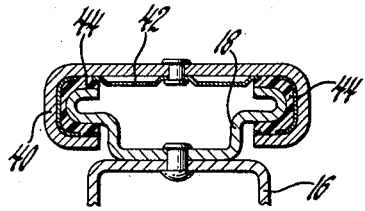
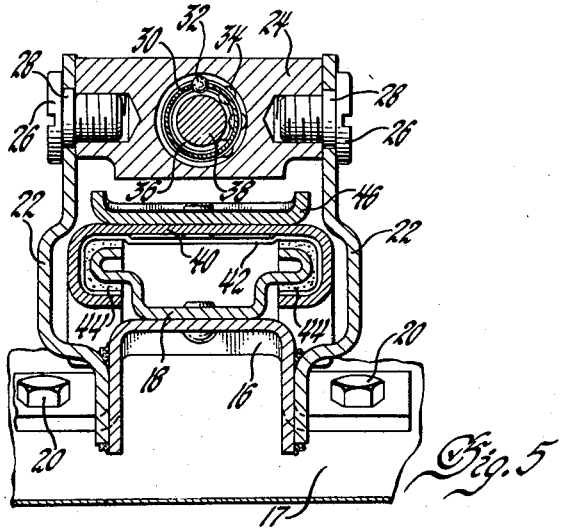

United States Patent Office 2,927,627
Patented Mar. 8, 1960

2,927,627

VEHICLE SEAT ADJUSTER

Thomas E. Lohr, Detroit, Mich., assignor to General Motors Corporation, Detroit, Mich., a corporation of Delaware Application May 12, 1958, Serial No. 734,611

2 Claims. (Cl. 155—14)

This invention relates to seat adjusters for vehicles and more particularly to a power driven seat adjuster.

The front seats of vehicles are slidably mounted on spaced pairs of upper and lower tracks for fore and aft adjustment and in many cases a motor is provided to accomplish the adjustment. Various seat adjuster arrangements have been used, however, conventional designs are not satisfactory for low silhouette vehicles for as vehicles become lower the drive shaft tunnel that runs between the seat tracks occupies more of the vertical space between the floor and seat bottom thereby leaving little or no room in that area for the seat adjuster mechanism.

An object of the invention is to provide a power driven seat adjuster mechanism which is economical in construction and which is arranged compactly in the seat track area and away from the drive shaft tunnel area.

Other objects of the invention will be apparent from the following description, reference being had to the accompanying drawings wherein the preferred form of the invention is shown.

In the drawings:

Figure 1 is a side elevational view, partially broken away, of the seat adjuster at the left side of the front seat of a vehicle.

Figure 2 is a plan view, taken substantially on the plane indicated by the line 2—2 of Figure 1, of the entire seat adjuster mechanism.

Figure 3 is a sectional view through the left drive unit taken substantially on a plane indicated by the line 3—3 of Figure 1;

Figure 4 is a sectional view through the left drive unit taken substantially on a plane indicated by the line 4—4 of Figure 2;

Figure 5 is a sectional view of the left upper track anchor taken substantially on the plane indicated by the line 5—5 of Figure 1; and Figure 6 is a sectional view of the left track slipper taken substantially on the plane indicated by the line 6—6 of Figure 1.

Referring to the drawings, the front seat 10 of the vehicle is carried by a bottom frame 12 which is mounted at its sides to left and right seat adjusters 14 and 14'. The right seat adjuster 14' is similar to the left seat adjuster 14 and is accordingly not described separately although the like parts thereof are designated by prime numerals in the drawings for convenience.

The seat adjuster 14 includes a lower track support 16 which is secured to the vehicle floor 17 by bolts 20. The track support 16 has a generally C-sectioned lower track 18 riveted thereto which extends longitudinally of the vehicle and which is curved slightly in the vertical plane so that the seat 10 will have a low reclined attitude in the aft position and a high upright attitude in the forward position. A pair of brackets 22 are welded to the sides of the lower track support 16 and extend above the lower track 18. An anchor nut 24 is pivotally secured to the brackets 22 by bolts 26 which include a pivot bearing surface 28. The anchor nut 24 is of the ball bearing type and mounts a ball carrier race 30 which retains ball bearings 32 in internally threaded grooves 34 in the anchor nut. The ball bearings 32 also engage externally threaded grooves 36 on a drive screw 38, the action between the drive screw 38 and anchor nut 24 being like that between any nut and bolt except for reduced friction.

A generally C-sectioned upper track 40 is slidably secured to the lower track 18 by a pair of slippers 42 which are riveted to the interior of the upper track 40. The slippers 42 have a plurality of U-sectioned nylon bearings 44 which slidably engage the edges of the lower track 18. Since the upper track 40 embraces the lower track 18 on top and bottom as well as on either side, it is constrained for movement along the lower track in the fore and aft direction.

Front and rear supports 46 and 48 secure the seat frame 12 to the upper track 40 and the rear seat support is preferably provided with a bracket 50 adapted to receive a safety seat belt. A drive unit 52 is pivotally secured at one end by a bolt 54 to the rear support 48 immediately above the rearward end of the upper track 40 for swinging movement in the vertical plane thereof. The rear support 48 also includes a bracket 56 and a reversible drive electric motor 58 is mounted on the left bracket 56 by bolts 60. The drive unit 52 rotatably mounts the rear end of the drive screw 38 in bearings 62 and 64 and rotatably mounts in bearings 66 and 68 a worm 70 which engages a pinion 72 secured to the rear end of the drive screw 38. Rotation of the worm 70 in either direction will accordingly rotate the drive screw 38 through the pinion 72.

The motor 58 powers the drive units 52 and 52' through flexible couplings 74 and 74', the motor shaft 76 being directly connected to the coupling 74 and being connected to the coupling 74' by means of an intermediate flexible shaft 78 that crosses the drive shaft tunnel area. When the motor 58 is energized in either direction, the drive screws 38 and 38' are rotated to advance or retreat in the anchor nuts 24 and 24'. The drive screws advance in the anchor nuts to move the upper tracks and seat in a forward direction and retreat in the anchor nuts to move the seat in an aft direction. As previously noted, the seat tracks 18 and 40 are curved slightly in a circular arc in a vertical plane. The drive screw 38 being straight must therefore be able to swing slightly in the vertical plane as it advances and retreats. The pivotal support 26 for the anchor nut 24 and the pivotal support 54 for the drive unit 52 accommodates such slight swinging movement of the drive screw 38 and the flexible coupling 74 accommodates for the slight pivotal movement of the drive unit 52 with respect to the motor 58.

The seat track curvature provides a slight downward and rearward inclination and the seat adjusters may include antigravity coil springs 80 which connect at their forward ends to brackets 82 secured to the lower track supports 16 and at their rearward ends to the upper track brackets 56. The springs 80 also maintain constant engagement pressure on the seat adjuster drive mechanisms to take up any play due to manufacturing tolerance.

By providing a separate drive for each seat adjuster, co-ordinated movement between the left and right tracks is achieved without the use of bulky conventional co-ordinating linkages and by locating the drive mechanisms immediately above the seat adjuster tracks, maximum drive shaft tunnel space between the seat adjusters is obtained.

While the embodiment of the invention here described is preferred, it is understood that modifications may be made by the exercise of skill in the art which will lie within the scope of the invention.

I claim:

1. A seat adjuster comprising left and right assemblies each including a lower track having a slight longitudinal curvature, an upper track of complementary curvature secured to the lower track for sliding movement in fore and aft direction and restrained against movement in other directions, the rearward portions of the tracks being lower than the forward portions, a bracket secured to the forward portion of the lower track and extending above the tracks, a nut pivotally mounted on the bracket directly above the forward portion of the upper track, a support secured to the rearward portion of the upper track and extending above the tracks, a drive unit pivotally mounted on the support directly above the rearward portion of the upper track, a rotatable drive screw projecting from the drive unit with its axis extending directly above the upper track in fore and aft direction and drivingly engaged with the nut whereby rotation of the drive screw will move the upper track in fore and aft direction with the nut acting as an anchor, and a reversible motor mounted on one of the upper tracks at the rearward portion thereof and drivingly connected to both drive units through flexible couplings, the drive to one unit including a flexible shaft.

2. A seat adjuster comprising left and right assemblies each including a lower track having a slight longitudinal curvature and having a generally C-shaped cross-section, an upper track of complementary curvature and generally complementary cross-section secured to the lower track for sliding movement in fore and aft direction and restrained against movement in other directions, the rearward portions of the tracks being lower than the forward portions, a bracket secured to the forward portion of the lower track and extending above the tracks, a nut pivotally mounted on the bracket directly above the forward portion of the upper track, a support secured to the rearward portion of the upper track and extending above the tracks, a drive unit pivotally mounted on the support directly above the rearward portion of the upper track, a rotatable drive screw projecting from the drive unit with its axis extending directly above the upper track in fore and aft direction and drivingly engaged with the nut whereby rotation of the drive screw will move the upper track in fore and aft direction with the nut acting as an anchor, a coil spring connecting the upper and lower tracks to urge the upper track forwardly, and a reversible motor mounted on one of the drive unit supports and drivingly connected to both drive units.

References Cited in the file of this patent

UNITED STATES PATENTS

| | | |
|---|---|---|
| 1,647,522 | Hoffer et al. | Nov. 1, 1927 |
| 1,893,531 | Ball | Jan. 10, 1933 |
| 1,921,224 | Floraday | Aug. 8, 1933 |
| 2,682,912 | Johnson et al. | July 6, 1954 |
| 2,765,024 | Brundage | Oct. 2, 1956 |
| 2,809,688 | Brundage | Oct. 15, 1957 |